No. 788,871. PATENTED MAY 2, 1905.
D. B. ADAMS.
AUTOMATIC STOPPING DEVICE FOR ENGINES OR THE LIKE.
APPLICATION FILED AUG. 29, 1902.
2 SHEETS—SHEET 1.
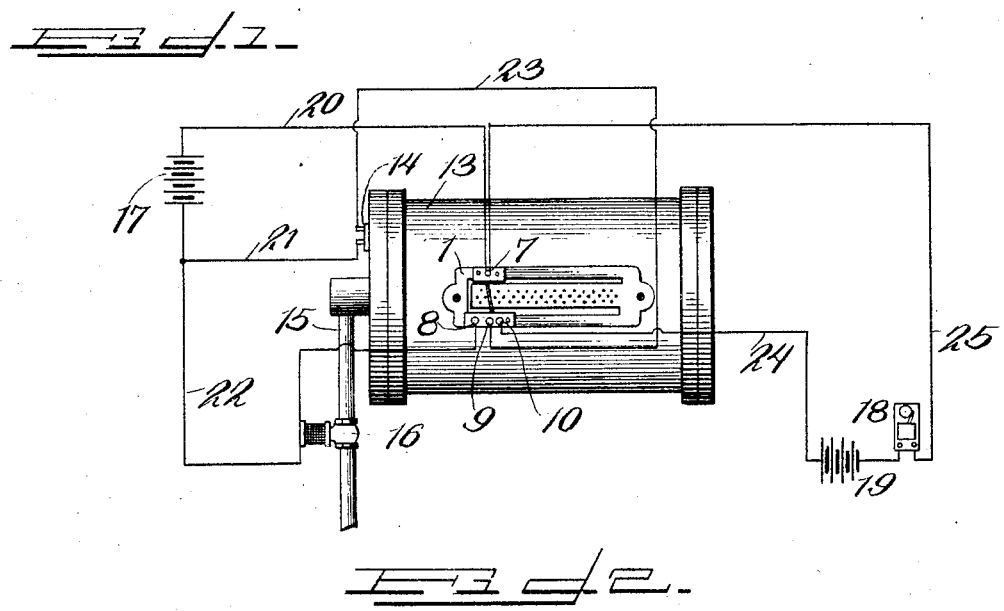
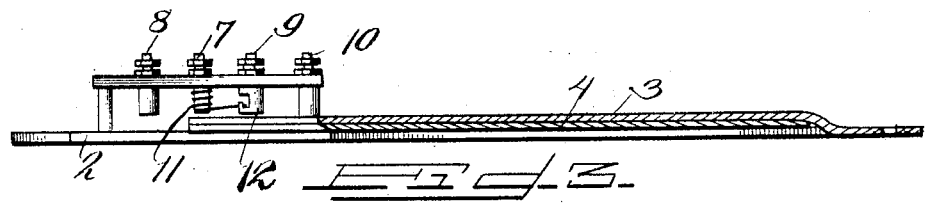
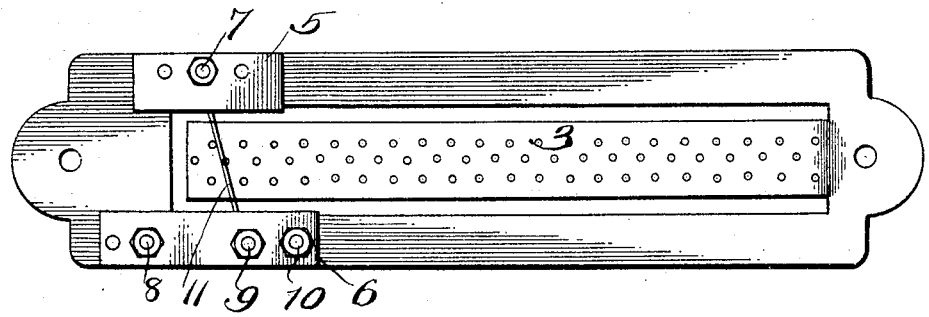
WITNESSES:
Harry A. Goss
C. F. Carrington
INVENTOR
Daniel B. Adams
BY
Chapin Hayward & Markle
ATTORNEYS No. 788,871. PATENTED MAY 2, 1905.
D. B. ADAMS.
AUTOMATIC STOPPING DEVICE FOR ENGINES OR THE LIKE.
APPLICATION FILED AUG. 29, 1902.
2 SHEETS—SHEET 2.
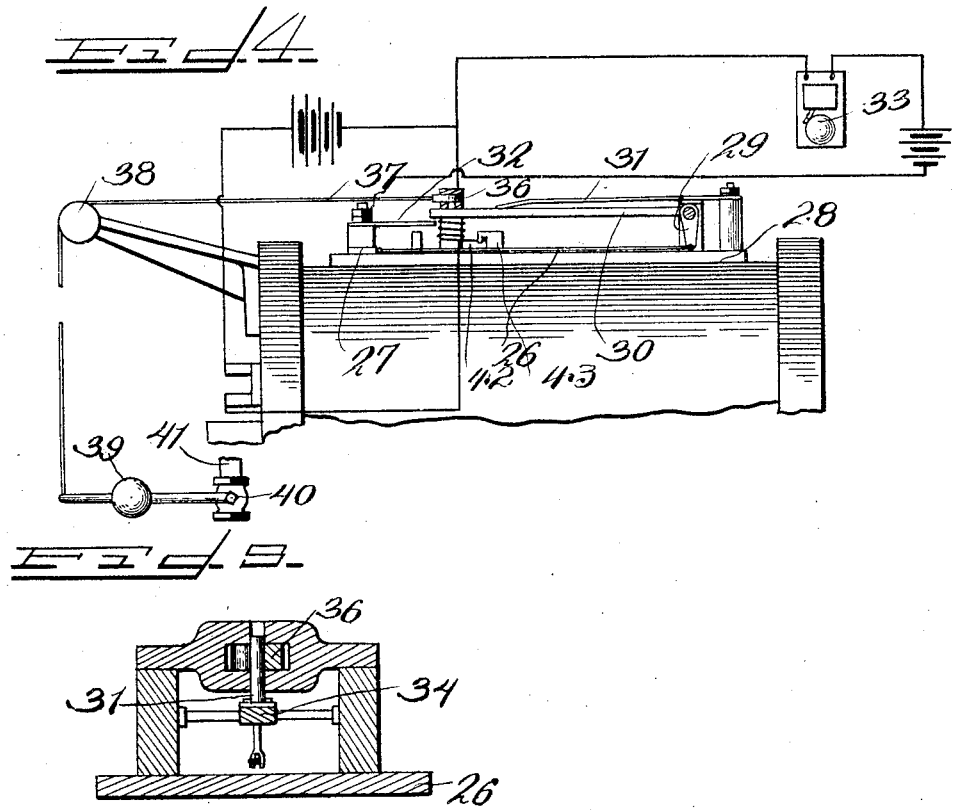
WITNESSES:
Harry P. Goss,
C. F. Carrington
INVENTOR
Daniel B. Adams
BY
Chapin Heywood & Marble
ATTORNEYS No. 788,871.                                               Patented May 2, 1905.

UNITED STATES PATENT OFFICE.

DANIEL B. ADAMS, OF SUMMITVILLE, NEW YORK.

AUTOMATIC STOPPING DEVICE FOR ENGINES OR THE LIKE.

SPECIFICATION forming part of Letters Patent No. 788,871, dated May 2, 1905.

Application filed August 29, 1902. Serial No. 121,416.

*To all whom it may concern:*

Be it known that I, DANIEL B. ADAMS, a citizen of the United States, residing at Summitville, in the county of Sullivan and State of New York, have invented certain new and useful Improvements in Automatic Stopping Devices for Engines or the Like; and I do hereby declare the following to be a full, clear, and exact description of the same, such as will enable others skilled in the art to which it appertains to make and use the same.

My invention relates to improvements in automatic stopping devices for stopping the operation of explosion or internal-combustion engines (such as what are commonly termed "gas-engines" and "oil-engines," for example) when the cylinder of the engine becomes overheated because of interruption in the circulation of water through the jacket or for any other reason.

My invention consists in the arrangement of a thermostat so located as to be influenced by rise in temperature of the engine-cylinder to break the ignition-circuit of the engine and also when desired to cause the closing of a fuel-valve, and my invention consists, further, in causing the said thermostat to operate a suitable alarm in advance of the interruption of the ignition-circuit by said thermostat.

In the operation of water-cooled explosion or internal-combustion engines it sometimes happens that the circulation of the cooling-water ceases. This may happen from a variety of causes. Thus if the water be drawn from a water-main the water in the said main may be turned off, or other demands on the main may be so great as to prevent the water from reaching the engine. If the circulation is produced by a circulating-pump, this pump may get out of order, or there may be a stoppage in one of the pipes or in the jacket, or the water-supply pipe may be broken. If the engine is allowed to run after the circulation ceases, the cylinder becomes overheated, and this may result in burning out the gasket at the rear of the cylinder or in cracking of the cylinder. If the gasket between the cylinder and cylinder-head is burned out, the cylinder-head must be removed to replace the gasket, and this frequently involves dismounting a considerable portion of the mechanism of the engine.

The objects of my invention are to stop the operation of engines of the type described when the cylinders thereof become overheated for any reason, to render the invention applicable to different types of electrical ignition systems, and to make the stopping device simple, compact, durable, easy of application, certain in action, and inexpensive.

In another application for Letters Patent, filed May 23, 1902, Serial No. 108,630, I have illustrated, described, and claimed an automatic stopping device for engines, such as above described, adapted to be connected to the pipe or passage through which the cooling-water passes after leaving the jacket and to be operated mechanically when this water fails to circulate for any reason, the stopping device being arranged, preferably, to operate and break at such times the igniter-circuit of the engine.

I will now proceed to describe my invention with reference to the accompanying drawings, in which certain forms of apparatus embodying my invention are illustrated, and will then point out the novel features in claims.

In the said drawings, Figure 1 shows a top view of an engine-cylinder to which is attached an electrical thermostat connected with suitable mechanism for stopping the operation of the engine and for giving an alarm. Fig. 2 is a side view and partial vertical section of the thermostat shown in Fig. 1, the thermostat being shown on a larger scale. Fig. 3 is a top view of the thermostat shown in Figs. 1 and 2. Fig. 4 is a side view of another form of thermostat which may be employed, the connections by means of which an alarm may be given and the cut-off for the supply of gas being also shown. Fig. 5 is a detail cross-section of a portion of this thermostat, showing the means employed for releasing the weight-cord.

Referring now to the drawings and at first to Figs. 1 to 2 thereof, the thermostat 1 there shown consists of a base 2, adapted to be attached to the engine cylinder or jacket in such manner that it is in contact therewith.

This base 2 carries a thermostatic member consisting of strips 3 and 4 of metals having different rates of expansion. The strip 3 may be a part of the base-plate 2, as shown, and may with advantage be of material such as iron or steel. The strip 4 may be of zinc or some other metal having a higher rate of expansion than that of the metal from which strip 3 is formed. It is well known that such a thermostatic member tends to curl upward as it is heated. Two strips of insulating material (such as mica or fiber) 5 and 6 are suitably supported above the base-plate 2 and carry binding-posts 7, 8, 9, and 10. Each of these binding-posts projects below the block of insulation by which it is supported, and to binding-post 7 is connected a coiled spring 11, the free end of which projects across the thermostat above the thermostatic member 3 4 thereof and normally is engaged and held by the hook-shaped lower portion 12 of binding-post 9. Binding-post 10 is electrically connected to the base 2 of the thermostat, and therefore to the upper strip 3 of the thermostatic member. When spring 11 is freed from hook 12 by the rise of the thermostatic member 3 4, it swings to the left of Figs. 2 and 3 until it makes contact with binding-post 8. The electrical connections which may be employed are shown in Fig. 1. This figure shows the engine-cylinder 13, an igniter-plug 14, a fuel-supply pipe 15, provided with an electrically-operated valve 16, a battery 17 for operating the electric valve 16 and for supplying igniting-current, an alarm-bell 18, and a separate battery 19 therefor. Obviously the battery 17 might also supply current for operating the bell; but it is often considered preferable to insulate both sides of the igniter-circuit from the engine-cylinder, and therefore I prefer to employ a separate battery for ringing the bell. One pole of battery 17 is connected by conductor 20 to binding-post 7, and the other pole of said battery is connected by conductor 21 to one terminal of the igniter 14 and by conductor 22 to the operating-magnet of valve 16 and thence to binding-post 8. A conductor 23 connects the second terminal of the igniter-plug 14 to binding-post 9. A conductor 24 connects one pole of battery 19 with binding-post 10, and another conductor 25 connects the opposite pole of battery 19 through bell 18 to binding-post 7. Ignition may be produced either by means of a jump spark or by movable contacts within the cylinder, as preferred. I have not shown the means employed for interrupting the igniter-circuit, but have merely indicated a plug diagrammatically. It will be observed that normally the igniter-circuit is complete, so far as the connections through the thermostat are concerned, but that the circuits through the valve 16 and through the bell 18 are normally broken. If, however, for any reason— as, for instance, failure of the cooling-water supply—the cylinder and cylinder-jacket become overheated to an undesirable degree, the thermostatic member 3 4 will curl upward to such an extent as first of all to make contact with a spring 11, thereby completing the bell-circuit, and then presently to lift said spring from the hook 12, releasing it and permitting it to make contact with binding-post 8, thereby breaking the igniter-circuit at the thermostat and shutting off the fuel-supply. Either the cutting off of the fuel-supply or the breaking of the igniter-circuit is effected to stop the engine; but it is preferable to employ both, since a double safeguard is thereby given and since the breaking of the igniter-circuit insures immediate stoppage of the combustion in the engine-cylinder, while the closing of the valve 16 prevents waste of the explosive mixture while the engine still continues to turn over by the inertia of its parts and also prevents possible explosion in the exhaust-pipe muffler when the engine is started again, due to accumulation of combustible gases in the exhaust-passages.

In Fig. 4 I illustrate another form of thermostat which may be employed, if desired. The thermostatic member in this case consists of a rod 26, connected at one end to the binding-post 27 of the base-plate 28 and connected at the other end to a bell-crank lever 29 30, of which arm 29 is relatively short and arm 30 relatively much longer. A spring 31 tends to press arm 30 down, but can do so only when the rod or wire 26 expands; but when the cylinder becomes heated to an objectionable degree said rod or wire 26 expands sufficiently first of all to permit arm 30 to make contact with a contact-spring 32, which is in circuit with the alarm-bell 33, and then to draw a pin 34, Fig. 5, which is connected to said arm 30, out of a hook 36, which is connected by a cord 37, running over a pulley 38, to a weighted valve-lever 39 and a valve 40, located in the fuel-supply pipe 41. When the hook 36 is released as thus described, the weight 39 falls, cutting off the gas-supply. This form of thermostat may also be caused to break the igniter-circuit. To that end a spring 42, similar to the spring 11 of Figs. 2 and 3, is provided, said spring being held by a pin 43, but being disengaged therefrom when the arm 30 descends. Spring 42 and pin 43 are included normally in the igniter-circuit, and when contact between them is interrupted the igniter-circuit is broken.

It is often desirable to give warning that the engine is being stopped or is about to be stopped by the automatic stopping device. For example, when the engine is employed for driving machinery it is often desirable to have sufficient warning of the stopping of the engine to enable the workmen to disconnect and stop the machinery before the engine stops. Such warning may be furnished by means of a suitable alarm, such as the electric bell 18, which, as will be seen, will be rung through contact of strip 3 with spring 11 before the said spring is released and caused to break the igniter-circuit.

It will be observed that this stopping device is operated directly by rise in temperature, which also creates the occasion for stopping the engine. The device is therefore capable of stopping the engine when the cylinder thereof becomes overheated from any cause.

It is obvious that various forms of thermostats may be employed and various means for controlling the operation of the engine by means of the thermostat. I therefore do not limit myself to the particular constructions illustrated and described.

What I claim is—

1. In a stopping device for engines and the like, the combination with an engine-cylinder, and electrical igniting means therefor, of a thermostat located in proximity to said cylinder, controlling the igniter-circuit and arranged to interrupt the same when the temperature of said cylinder exceeds a predetermined degree.

2. In a stopping device for engines and the like, the combination with an engine-cylinder, electrical igniting means therefor, and a valve controlling the supply of working fluid to said engine, of a thermostat located in proximity to said cylinder, and comprising a movable thermostatic member, and means operated by the movement of said member for breaking said igniter-circuit and closing said valve.

3. In a stopping device for engines and the like, the combination with an engine-cylinder, electrical igniting means therefor, and a valve controlling the supply of working fluid to said engine, of a thermostat located in proximity to said cylinder, and comprising a movable thermostatic member, means operated by the movement of said member for breaking said igniter-circuit and closing said valve, and an electrically-operated alarm, the circuit of which is arranged to be operated by the movement of said thermostatic member.

4. The combination with a jacketed engine-cylinder, and means for supplying cooling fluid to the jacket, of a thermostat located in proximity to the jacket, engine-stopping means controlled by the thermostat and arranged to be operated thereby to stop the engine, and an alarm or signaling device likewise operated by the thermostat, said thermostat arranged to operate the signaling device or alarm in advance of the engine-stopping means.

5. The combination with the engine-cylinder of a thermostat, an ignition-circuit, and devices carried by the thermostat for opening the ignition-circuit when the heat of the cylinder is excessive.

6. The combination with the engine-cylinder and water-jacket, of a thermostat in proximity to the engine-cylinder, the ignition-circuit, and devices carried by the thermostat for opening and closing the ignition-circuit.

7. The combination with the engine-cylinder and its water-jacket, of a thermostat arranged in close proximity to the water-jacket, an ignition-circuit, and means carried by the thermostat for opening the ignition-circuit when the water ceases to flow in the water-jacket, or becomes excessively hot.

In testimony whereof I affix my signature in the presence of two witnesses.

DANIEL B. ADAMS.

Witnesses:
AMBROSE M. GRAHAM,
ANGUS HANYEN.